United States Patent
Bunzen et al.

(10) Patent No.: US 10,934,378 B2
(45) Date of Patent: Mar. 2, 2021

(54) BIOGENIC OLIGOMERS AS REACTIVE ADDITIVES FOR THE CURING OF REACTIVE RESINS

(71) Applicant: Hilti Aktiengesellschaft, Schaan (LI)

(72) Inventors: Jens Bunzen, Augsburg (DE); Thomas Bürgel, Landsberg (DE); Beate Gnass, Gersthofen (DE); Klaus Jaehnichen, Dresden (DE); Brigitte Voit, Dresden (DE)

(73) Assignee: HILTI AKTIENGESELLSCHAFT, Schaan (LI)

( * ) Notice: Subject to any disclaimer, the term of this patent is extended or adjusted under 35 U.S.C. 154(b) by 0 days.

(21) Appl. No.: 15/733,075

(22) PCT Filed: Nov. 19, 2018

(86) PCT No.: PCT/EP2018/081672
§ 371 (c)(1),
(2) Date: May 7, 2020

(87) PCT Pub. No.: WO2019/105776
PCT Pub. Date: Jun. 6, 2019

(65) Prior Publication Data
US 2020/0354494 A1   Nov. 12, 2020

(30) Foreign Application Priority Data
Nov. 28, 2017   (EP) .................................... 17204044

(51) Int. Cl.
*C08F 222/14* (2006.01)
*C04B 26/16* (2006.01)
*C08F 222/10* (2006.01)
*C09K 8/44* (2006.01)
*C04B 111/00* (2006.01)

(52) U.S. Cl.
CPC ............ *C08F 222/14* (2013.01); *C04B 26/16* (2013.01); *C08F 222/1006* (2013.01); *C09K 8/44* (2013.01); *C04B 2111/00715* (2013.01)

(58) Field of Classification Search
CPC ...................................................... C08F 222/14
See application file for complete search history.

(56) References Cited

U.S. PATENT DOCUMENTS

| 8,598,293 | B2 | 12/2013 | Szkudlarek et al. | |
| 2012/0116025 | A1* | 5/2012 | Szkudlarek | C08K 5/103 525/303 |
| 2015/0232595 | A1* | 8/2015 | Leitner | C08F 220/18 524/558 |
| 2016/0060493 | A1 | 3/2016 | Grün et al. | |

FOREIGN PATENT DOCUMENTS

| DE | 10 2012 219652 | 4/2014 |
| DE | 10 2014 103923 | 10/2014 |
| WO | 2010-108939 | 9/2010 |

OTHER PUBLICATIONS

International Search Report dated Dec. 20, 2018 in PCT/EP2018/081672, with English Translation, 5 pages.
Written Opinion issued Dec. 20, 2018, in PCT/EP2018/081672, 6 pages.

* cited by examiner

*Primary Examiner* — Daniel H Lee
(74) *Attorney, Agent, or Firm* — Grüneberg and Myers PLLC

(57) ABSTRACT

A reactive resin includes a vinyl ester resin as a base resin and an oligomeric itaconic acid ester as a reactive diluent.

20 Claims, 3 Drawing Sheets

BIOGENIC OLIGOMERS AS REACTIVE ADDITIVES FOR THE CURING OF REACTIVE RESINS

CROSS-REFERENCE TO RELATED APPLICATIONS

This application is a National Stage entry under § 371 of International Application No. PCT/EP2018/081672, filed on Nov. 19, 2018, and which claims the benefit of European Application No. 17204044.6, filed on Nov. 28, 2017, the contents of each of which are hereby incorporated by reference in their entireties.

BACKGROUND OF THE INVENTION

Field of the Invention

The present invention relates to a reactive resin comprising a vinyl ester resin as a base resin and an oligomeric itaconic acid ester as a reactive diluent.

Discussion of the Background

The use of reactive resin mortars based on radically curable compounds as binders has long been known. In the field of fastening technology, the use of resins as an organic binder for chemical fixing technology, for example as a dowel mass, has become accepted. These are composite materials which are packaged as multicomponent systems, one component containing the reactive resin and the other component containing the curing agent. Other common constituents such as solvents, including reactive solvents (reactive diluents), may be contained in one and/or the other component. By mixing the two components, the curing reaction, i.e. the polymerization, is initiated by radical formation and the resin is cured to obtain duromers. Vinyl ester resins and unsaturated polyester resins are often used as radically curable compounds, in particular for chemical fastening technology.

Vinyl ester resins and in particular vinyl ester urethane resins are used as base resins due to their advantageous properties, said vinyl ester resins and vinyl ester urethane resins being obtainable by reaction of monomeric or polymeric aromatic diisocyanates and hydroxy-substituted methacrylates, such as hydroxyalkyl methacrylate. EP 0713015 B1, for example, describes dowel compositions comprising unsaturated polyester resins, vinyl ester resins, including vinyl ester urethane resins, as base resins. The connections of such systems are based on classic petroleum chemistry, in which the raw materials are obtained from fossil raw material sources, such as petroleum.

It is common knowledge that fossil raw materials such as petroleum are not inexhaustible and will eventually dry up. In the event that the availability of fossil raw material sources decreases, there is a risk that the compounds that are essential for the high demands placed on the chemical fastening systems may no longer be available.

Therefore, there will be a future need for alternative systems based on renewable raw materials with a high proportion of carbon from renewable raw materials in order to be able to continue to provide highly specialized chemical fastening systems.

DE 10 2014 103 923 A1 describes, for example, reactive resin components to which biogenic fillers such as flours of kernels or skins of known fruits (walnuts, cherries, olives), or of vegetable fibers, lignins, tannins, polysaccharides or sugar have been added to increase the biogenic content. However, the reactive components of the resin compositions described are based on fossil raw materials. There is therefore also a need for base resins and reactive diluents which are available from biogenic raw materials.

Suitable biogenic starting materials for the preparation of reactive components are, for example, sugar derivatives. DE 10 2012 219 476 A1 describes a resin mixture based on a vinyl ester urethane resin which is obtained by reacting isosorbide derivatives with isocyanates and hydroxy(meth) acrylic acid esters.

Itaconic acid derivatives are also promising biogenic starting materials, which can be converted into reactive components for reactive resins by appropriate functionalization. Vinyl ester-based resin compositions containing methacrylate derivatives and itaconic acid esters as reactive diluents are known. WO 2010/108939 A1 describes a vinyl ester-based reactive resin having reduced viscosity, which can be achieved by partially replacing the reactive thinner with an itaconic acid ester. A disadvantage of the reactive resin described is that the reactivity of the reactive resin and its curing is not always guaranteed.

DE 10 2012 219 652 A1 also describes reactive resin components which contain functionalized itaconic acid derivatives as reactive diluents.

There is therefore a need for a reactive resin that largely consists of constituents which are obtainable on the basis of renewable raw materials and with which the storage stability and reactivity of the reactive resin and the reactive resin component produced therefrom can be controlled in accordance with the particular use.

SUMMARY OF THE INVENTION

This can be achieved by a reactive resin according to a preferred embodiment and a reactive resin component according to another preferred embodiment. The present invention further relates to a multi-component system which contains the reactive resin component according to the invention, and to the use of an itaconic acid ester as a reactive diluent. Preferred embodiments can be found below.

A subject object of the invention is a reactive resin comprising a vinyl ester resin as a base resin and an oligomeric itaconic acid ester as a reactive diluent.

DETAILED DESCRIPTION OF THE INVENTION

For a better understanding of the present invention, the following explanations of the terminology used herein are considered useful. In the context of the invention:

"base resin" means a typically solid or high-viscosity radically polymerizable resin which cures by polymerization (e.g. after addition of an initiator in the presence of an accelerator);

"reactive resin master batch" means the reaction product of the reaction for producing the backbone resin, i.e. typically a mixture of backbone resin, stabilizer and other constituents of the reaction mixture;

"reactive resin" means a mixture of a reactive resin master batch, an accelerator and an inhibitor (also referred to as an accelerator-inhibitor system), a reactive diluent and optionally further additives; the reactive resin is typically liquid or viscous and can be further processed to form a reactive resin component;

"inhibitor" means a substance which suppresses unwanted radical polymerization during the synthesis or storage of a resin or a resin-containing composition (these substances are also referred to in the art as "stabiizers") or which delays the radical polymerization of a resin after addition of an initiator, usually in conjunction with an accelerator (these substances are also referred to in the art as "inhibitors"—the meaning of each term is apparent from the context);

"initiator" means a substance which (usually in combination with an accelerator) forms reaction-initiating radicals;

"accelerator" means a reagent which reacts with the initiator so that larger quantities of free radicals are produced by the initiator even at low temperatures, or which catalyzes the decomposition reaction of the initiator;

"reactive diluents" means liquid or low-viscosity monomers and base resins which dilute other base resins or the reactive resin master batch and thereby impart the viscosity necessary for application thereof, which contain functional groups capable of reacting with the base resin, and which for the most part become a constituent of the cured composition (e.g. of the mortar) in the polymerization (curing); reactive diluents are also referred to as co-polymerizable monomers;

"reactive resin component" means a liquid or viscous mixture of reactive resin and fillers and optionally further components, e.g. additives; typically, the reactive resin component is one of the two components of a two-component reactive resin system for chemical fixing;

"hardener component" means a composition containing, as a curing agent, an initiator for the polymerization of a base resin; the hardener component may be solid or liquid and may contain, in addition to the initiator, a solvent and fillers and/or additives; typically the hardener component, in addition to the reactive resin component, is the other of the two components of a two-component reactive resin chemical fixing system;

"two-component system" or "two-component reactive resin system" means a reactive resin system comprising two separately stored components, a reactive resin component (A) and a hardener component (B), so that curing of the base resin contained in the reactive resin component takes place after the mixing of the two components;

"multi-component system" or "multi-component reactive resin system" means a reactive resin system comprising a plurality of separately stored components, including a reactive resin component (A) and a hardener component (B), so that curing of the base resin contained in the reactive resin component takes place after the mixing of all components;

"(meth)acrylic . . . / . . . (meth)acrylic . . . " means both the "methacrylic . . . / . . . methacrylic" and the "acrylic . . . / . . . acrylic . . . " compounds; "methacrylic . . . / . . . methacrylic" compounds are preferred in the present invention;

"a," "an," "any," as the indefinite article preceding a class of chemical compounds, e.g. preceding the term "itaconic acid ester," means that one or more compounds included in this class of chemical compounds, e.g. various itaconic acid esters, may be intended. In a preferred embodiment, this article means only a single compound;

"at least one" means numerically "one or more." In a preferred embodiment, the term means numerically "one;"

"contain," "comprise," and "include" mean that further constituents may be present in addition to those mentioned. These terms are intended to be inclusive and therefore encompass "consist of." "Consist of" is intended to be exclusive and means that no further constituents may be present. In a preferred embodiment, the terms "contain," "comprise" and "include" mean the term "consist of;"

"approximately" or "about" or "approx." before a numerical value means a range of ±5% of this value, preferably ±2% of this value, more preferably ±1% of this value, particularly preferably ±0% of this value (i.e. exactly this value);

a range limited by numbers, e.g. "from 100° C. to 120° C.," means that the two extreme values and any value within this range are disclosed individually.

Unless explicitly stated otherwise, all standards cited in this text (e.g. DIN standards or ISO standards) were used in the version that was current on the filing date of this application.

The present application describes the synthesis of short-chain, reactive oligomers from itaconic acid and alkanediols by means of melt polycondensation in the presence of a catalyst. The itaconic acid esters obtained can be used directly as reactive diluents in resin mixtures without complex processing. The addition of the oligomers increases the proportion of bio-based components in the resin.

A first subject of the present invention is a reactive resin, comprising i) a base resin comprising at least one vinyl ester resin, and ii) at least one itaconic acid ester of the formula (I),

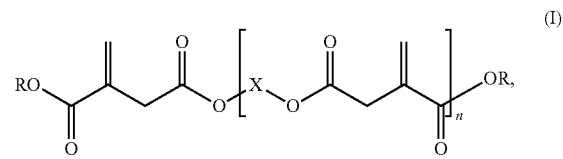

in which R represents hydrogen or a $C_1$-$C_6$ alkyl group, X represents a $C_2$-$C_{10}$ alkylene group and n is 2.

A main constituent of the reactive resin according to the invention is therefore a base resin which contains a vinyl ester resin.

Vinyl ester resins which comprise unsaturated groups only in the end position are obtained, for example, by reacting epoxy monomers, oligomers or polymers (for example bisphenol A digylcidyl ether, phenol novolak-type epoxides or epoxy oligomers based on tetrabromobisphenol A) with, for example, (meth)acrylic acid or (meth)acrylamide. Preferred vinyl ester resins are (meth)acrylate-functionalized resins and resins which are obtained by reacting an epoxy monomer, oligomer or polymer with methacrylic acid or methacrylamide, preferably with methacrylic acid. Examples of such compounds are known from the applications U.S. Pat. Nos. 3,297,745 A, 3,772,404 A, 4,618,658 A, GB 2 217 722 A1, DE 37 44 390 A1 and DE 41 31 457 A1.

Particularly suitable and preferred as vinyl ester resin are (meth)acrylate-functionalized resins which are obtained, for example, by reacting difunctional and/or higher-functional isocyanates with suitable acrylic compounds, optionally with the involvement of hydroxy compounds which contain at least two hydroxyl groups, as described in DE 3940309 A1, for example.

Accordingly, the vinyl ester resin is preferably a vinyl ester urethane resin.

Aliphatic (cyclic or linear) and/or aromatic difunctional or higher-functional isocyanates or prepolymers thereof can be used as isocyanates. The use of such compounds serves to increase the wettability and thus to improve the adhesive properties. Aromatic difunctional or higher-functional isocyanates or prepolymers thereof are preferred, aromatic difunctional or higher-functional prepolymers being particularly preferred. Examples include toluene diisocyanate (TDI), diisocyanatodiphenylmethane (MDI) and polymeric diisocyanatodiphenylmethane (pMDI) to increase chain reinforcement and hexane diisocyanate (HDI) and isophorone diisocyanate (IPDI), which improve flexibility, from which polymeric diisocyanatodiphenylmethane is particularly preferred.

Suitable acrylic compounds are acrylic acid and acrylic acids substituted on the hydrocarbon group, such as methacrylic acid, hydroxyl-containing esters of acrylic or methacrylic acid with polyhydric alcohols, pentaerythritol tri (meth)acrylate, glycerol di(meth)acrylate, such as trimethylol propane di(meth)acrylate, neopentyl glycol mono(meth)acrylate. Preference is given to acrylic or methacrylic acid hydroxyl alkyl esters, such as hydroxyethyl (meth)acrylate, hydroxypropyl (meth)acrylate, polyoxyethylene (meth)acrylate, polyoxypropylene (meth)acrylate, especially since such compounds are used to sterically prevent the saponification reaction.

Dihydric or higher-hydric alcohols are suitable as difunctional or higher-functional hydroxy compounds, for example secondary products of ethylene or propylene oxide, such as ethanediol, di- or triethylene glycol, propanediol, dipropylene glycol, other diols, such as 1,4-butanediol, 1,6-hexanediol, neopentyl glycol, diethanolamine, furthermore bisphenol-A or F or their ethoxylation and/or hydrogenation or halogenation products, higher-hydric alcohols, such as glycerol, trimethylolpropane, hexanetriol and pentaerythritol, hydroxyl group-containing polyethers, e.g. oligomers of aliphatic or aromatic oxiranes and/or higher cyclic ethers, e.g. ethylene oxide, propylene oxide, styrene oxide and furan, polyethers containing aromatic structural units in the main chain, e.g. those of the bisphenol A or F, hydroxyl group-containing polyesters based on the above alcohols or polyethers and dicarboxylic acids or their anhydrides, e.g. adipic acid, phthalic acid, tetra- or hexahydrophthalic acid, hetic acid, maleic acid, fumaric acid, itaconic acid, sebacic acid and the like. Particular preference is given to hydroxy compounds having aromatic structural units for reinforcing the chain of the resin, hydroxy compounds which contain unsaturated structural units, such as fumaric acid, for increasing the crosslinking density, branched or star-shaped hydroxy compounds, in particular trihydric or higher-hydric alcohols and/or polyethers or polyesters containing their structural units, branched or star-shaped urethane (meth) acrylates for achieving lower viscosity of the resins or their solutions in reactive diluents and higher reactivity and crosslinking density.

According to a preferred embodiment of the present invention, the vinyl ester resin is a reaction product of diisocyanatodiphenylmethane (MDI), hydroxypropyl (meth)acrylate, and dipropylene glycol. The preparation of the vinyl ester resin is described in EP 0 713 015 A1, which is hereby introduced as a reference and reference is made to the entire disclosure thereof.

The vinyl ester resin preferably has a molecular weight M in the range of from 500 to 3000 daltons, more preferably from 500 to 1500 daltons (according to ISO 13885-1). The vinyl ester resin preferably has an acid value in the range of from 0 to 150 mg KOH/g resin, more preferably in the range of from 0 to 100 mg KOH/g resin, particularly preferably in the range of from 0 to 30 mg KOH/g resin (according to ISO 2114-2000).

All of these resins that can be used according to the invention can be modified according to methods known to a person skilled in the art, for example to achieve lower acid numbers, hydroxide numbers or anhydride numbers, or can be made more flexible by introducing flexible units into the backbone, and the like.

In addition, the resin may contain other reactive groups that can be polymerized with a radical initiator such as peroxides, for example reactive groups derived from itaconic acid, citraconic acid and allylic groups and the like.

The base resin preferably contains at least 80.0 wt. %, more preferably at least 90.0 wt. %, particularly preferably at least 99.0 wt. %, of the vinyl ester resin, based on the total weight of the base resin. According to a particularly preferred embodiment, the base resin consists of the vinyl ester resin.

According to a preferred embodiment of the present invention, the reactive resin contains the base resin in an amount of from 50.0 to 95.0 wt. %, more preferably 60.0 to 90.0 wt. %, even more preferably 70.0 to 85.0 wt. %, particularly preferably 75.0 to 80.0 wt. %, based on the total weight of the reactive resin.

As a further component, the reactive resin according to the invention contains an oligomeric itaconic acid ester as a reactive diluent.

Itaconic acid and its ester derivatives have been identified as valuable chemicals that can be obtained from biomass. Therefore, these compounds are in principle suitable as a starting compound based on renewable raw materials.

The inventors were able to show that on this basis, constituents for reactive resins can be provided which have no negative effect on the properties of the reactive resin, either in terms of the curing properties or in terms of the properties of the cured compositions.

This is the case even though it is known that itaconic acid and its esters generally polymerize more slowly than methacrylic acid esters under the same conditions. Instead, it could be shown that the compounds based on itaconic acid used here can be used to specifically influence the properties of reactive resins based on vinyl ester resin.

According to the invention, the oligomeric itaconic acid ester is a compound of the general formula (I)

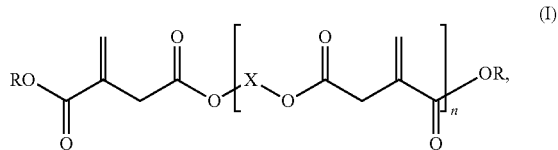

(I)

in which R represents hydrogen or a $C_1$-$C_6$ alkyl group, X represents a $C_2$-$C_{10}$ alkylene group, and n is $\geq 2$.

Accordingly, the itaconic acid ester according to the invention is preferably an oligomeric itaconic acid ester.

Strictly speaking, the oligomeric itaconic acid ester is not a pure ester, but also carries one or two carboxylic acid groups if one or both instances of R in the formula (I) are hydrogen. For the sake of simplicity, however, this form of formula (I) is also referred to below with the esters as "itaconic acid ester" or "oligomeric itaconic acid ester," because this form of formula (I) also contains the central diester groups with X.

The parameter n preferably has a value in the range of from 2 to 20, more preferably from 3 to 12, particularly preferably from 4 to 8.

Additionally or alternatively, the itaconic acid ester according to the invention of the formula (I) preferably has a weight-average molar mass $M_w$ of at least 350 g/mol, preferably from 400 to 4000 g/mol, more preferably from 450 to 2400 g/mol, even more preferably from 480 to 2000 g/mol, particularly preferably from 520 to 1700 g/mol.

The compounds of the formula (I) can be obtained by reacting approximately n+1 times the amount of itaconic anhydride and/or an itaconic acid dialkyl ester with diols, compounds having two terminal carboxyl groups and n+1 radically polymerizable carbon double bonds being obtained.

The diols can be obtained from renewable raw materials and are therefore of particular interest in the formulation of reactive resins which are based as far as possible on constituents based on renewable raw materials. Accordingly, according to the invention these are aliphatic $C_2$-$C_{10}$ alkanediols, such as ethylene glycol, 1,2-propanediol, 1,3-propanediol, 1,2-butanediol, 1,4-butanediol, 1,5-pentanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 2,2,4-trimethyl-1,6-hexanediol, in particular ethylene glycol, 1,3-propanediol, 1,4-butanediol and 2,2-dimethyl-1,3-propanediol (neopentyl glycol).

The diol is particularly preferably an aliphatic $C_3$-$C_8$ alkanediol, more preferably a $C_4$-$C_6$ alkanediol. X is therefore preferably a $C_3$-$C_6$ alkylene group, more preferably a $C_4$-$C_6$ alkylene group.

The use of the $C_2$-$C_{10}$ alkanediols has the advantage that they can be obtained from C-2 to C-10 basic building blocks of plant origin. For example, 1,3-propanediol can be obtained biotechnologically from glycerol. Glycerin is a component of all vegetable oils, for example as a by-product in the production of fatty acids and in the production of biodiesel.

It has been observed that storage-stable reactive resins with itaconic acid esters of the formula (I) are only obtained if the terminal carboxyl groups of the di-itaconic acid ester are esterified with the corresponding alcohols.

Therefore, R in formula (I) is preferably a $C_1$-$C_6$ alkyl group, and more preferably a methyl or ethyl group, with the methyl group being most preferred. The corresponding alcohols can also be obtained from renewable raw materials, for example methanol and ethanol being obtainable from biomass.

The itaconic acid esters of the general formula (I) are therefore completely obtainable from renewable raw materials.

The itaconic acid esters of the formula (I) are preferably prepared by transesterification of about n+1 times the amount of an itaconic acid dialkyl ester with the corresponding diol in the presence of a catalyst. The itaconic acid dialkyl ester is particularly preferably dimethyl itaconate. The catalyst is preferably a transition metal compound, particularly preferably a Ti-containing catalyst; titanium tetrabutanolate (Ti(OBu)$_4$) is particularly preferred.

Due to the preparation process, even if both terminal carboxyl groups are esterified, the itaconic acid ester according to the invention typically also contains functional groups of compounds with OH end groups of the following structures:

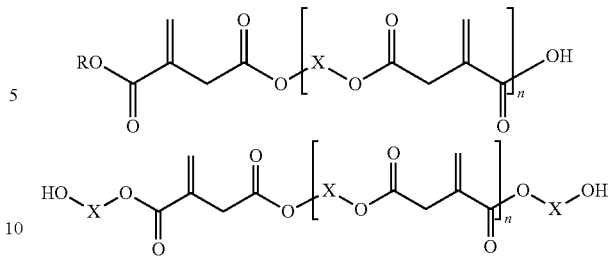

Despite these impurities, these products are referred to as "itaconic acid esters" in the context of the present invention.

In addition to the compounds of the formula (I), the reactive resin can also contain other low-viscosity co-polymerizable compounds having a (meth)acrylate group as a reactive diluent. Suitable reactive diluents are described in EP 1935 860 A1 and DE 195 31 649 A1. In principle, other conventional reactive diluents, alone or in a mixture with (meth)acrylic acid esters, can also be used, e.g. styrene, α-methylstyrene, alkylated styrenes such as tert-butylstyrene, divinylbenzene, vinyl ether and/or allyl compounds.

According to a preferred embodiment of the present invention, however, the reactive resin contains no further reactive diluent in addition to the at least one itaconic acid ester of the formula (I).

The reactive resin according to the invention preferably contains 5.0 to 40.0 wt. %, more preferably 10.0 to 30.0 wt. %, even more preferably 15.0 to 25.0 wt. %, particularly preferably 18.0 to 22.0 wt. %, of the at least one itaconic acid ester of the formula (I), based on the total weight of the reactive resin.

Accordingly, the reactive resin according to the invention contains 50.0 to 95.0 wt. %, more preferably 60.0 to 90.0 wt. %, even more preferably 70.0 to 85.0 wt. %, particularly preferably 75.0 to 80.0 wt. %, of the base resin and 5.0 to 40.0 wt. %, more preferably 10.0 to 30.0 wt. %, even more preferably 15.0 to 25.0 wt. %, particularly preferably 18.0 to 22.0 wt. %, of the at least one itaconic acid ester of the formula (I), based on the total weight of the reactive resin.

According to a more preferred embodiment of the invention, the reactive resin is in pre-accelerated form, that is to say it contains at least one accelerator for the initiator, which acts as a curing agent. Preferred accelerators are aromatic amines and/or salts of cobalt, manganese, tin, vanadium or cerium. Anilines, p- and m-toluidines and xylidines, which are substituted symmetrically or asymmetrically with alkyl or hydroxyalkyl radicals, have proven to be particularly advantageous as accelerators. The following preferred accelerators can be mentioned by way of example: N,N-dimethylaniline, N,N-diethylaniline, N,N-diethylolaniline, N-ethyl-N-ethylolaniline, N, N-di-isopropanol-p-toluidine, N,N-diisopropylidene-p-toluidine, N,N-dimethyl-p-toluidine, N,N-diethylol-p-toluidine, N,N-diethylol-m-toluidine, N,N-diisopropylol-m-toluidine, N,N-bis(2-hydroxyethyl)toluidine, N,N-bis(2-hydroxyethyl)xylidine, N-methyl-N-hydroxyethyl-p-toluidine, cobalt octoate, cobalt naphthenate, vanadium(IV) acetylacetonate and vanadium(V) acetylacetonate.

The accelerator or accelerator mixture is used according to the invention in an amount of from 0.05 to 5.0 wt. %, preferably 1.0 to 2.0 wt. %, based on the total weight of the reactive resin.

In a further embodiment of the invention, the reactive resin further contains at least one polymerization inhibitor to ensure storage stability and to adjust the gel time. According to the invention, the polymerization inhibitors which are conventionally used for radically polymerizable compounds, as are known to a person skilled in the art, are suitable as polymerization inhibitors. These further inhibitors are preferably selected from phenolic compounds and non-phenolic compounds, such as stable radicals and/or phenothiazines.

Phenols, such as 2-methoxyphenol, 4-methoxyphenol, 2,6-di-tert-butyl-4-methylphenol, 2,4-di-tert-butylphenol, 2,6-di-tert-butylphenol, 2,4,6-trimethylphenol, 2,4,6-tris(dimethylaminomethyl)phenol, 4,4'-thio-bis(3-methyl-6-tert-butylphenol), 4,4'-isopropylidenediphenol, 6,6'-di-tert-butyl-4,4'-bis(2,6-di-tert-butylphenol), 1,3,5-trimethyl-2,4,6-tris(3,5-di-tert-butyl-4-hydroxybenzyl)benzene, 2,2'-methylene-di-p-cresol, pyrocatechol, and butylpyrocatechols such as 4-tert-butylpyrocatechol and 4,6-di-tert-butylpyrocatechol, hydroquinones such as hydroquinone, 2-methylhydroquinone, 2-tert-butylhydroquinone, 2,5-di-tert-butylhydroquinone, 2,6-di-tert-butylhydroquinone, 2,6-dimethylhydroquinone, 2,3,5-trimethylhydroquinone, benzoquinone, 2,3,5,6-tetrachloro-1,4-benzoquinone, methylbenzoquinone, 2,6-dimethylbenzoquinone, naphthoquinone, or mixtures of two or more thereof, are suitable as phenolic inhibitors that are often a constituent of commercial radically curing reactive resins.

Phenothiazines such as phenothiazine and/or derivatives or combinations thereof, or stable organic radicals such as galvinoxyl and N-oxyl radicals, are preferably considered as non-phenolic polymerization inhibitors.

Examples of N-oxyl radicals which can be used are those described in DE 199 56 509. Suitable stable N-oxyl radicals (nitroxyl radicals) can be selected from 1-oxyl-2,2,6,6-tetramethylpiperidine, 1-oxyl-2,2,6,6-tetramethylpiperidin-4-ol (also referred to as TEMPOL), 1-oxyl-2,2,6,6-tetramethylpiperidin-4-one (also referred to as TEMPON), 1-oxyl-2,2,6,6-tetramethyl-4-carboxyl-piperidine (also referred to as 4-carboxy-TEMPO), 1-oxyl-2,2,5,5-tetramethylpyrrolidine, 1-oxyl-2,2,5,5-tetramethyl-3-carboxylpyrrolidine (also referred to as 3-carboxy-PROXYL), aluminum-N-nitrosophenylhydroxylamine, and diethylhydroxylamine. Further suitable N-oxyl compounds are oximes, such as acetaldoxime, acetone oxime, methyl ethyl ketoxime, salicyloxime, benzoxime, glyoximes, dimethylglyoxime, acetone-O-(benzyloxycarbonyl)oxime and the like.

The polymerization inhibitors may be used either alone or as a combination of two or more thereof, depending on the desired properties of the resin compositions. The combination of phenolic and non-phenolic polymerization inhibitors allows a synergistic effect, such as the adjustment of substantially drift-free adjustment of the gel time of the reactive resin.

The proportion by weight of the non-phenolic polymerization inhibitors is preferably in the range of from 1 ppm to 1 wt. %, preferably in the range of from 10 ppm to 1 wt. %, based on the total weight of the reactive resin.

The inhibitor is preferably a phenolic inhibitor. Pyrocatechol and butyl pyrocatechols, such as 4-tert-butyl pyrocatechol and 4,6-di-tert-butyl pyrocatechol, are particularly preferred.

According to a preferred embodiment, the reactive resin according to the invention contains up to 1.0 wt. %, more preferably 0.0001 to 0.5 wt. %, particularly preferably 0.01 to 0.1 wt. %, of the inhibitor, based on the total weight of the reactive resin.

Preferably, the reactive resin according to the invention therefore contains, more preferably consists of, 50.0 to 95.0 wt. %, more preferably 60.0 to 90.0 wt. %, even more preferably 70.0 to 85.0 wt. %, particularly preferably 75.0 to 80.0 wt. %, of the base resin and 5.0 to 40.0 wt. %, more preferably 10.0 to 30.0 wt. %, even more preferably 15.0 to 25.0 wt. %, particularly preferably 18.0 to 22.0 wt. %, of the at least one itaconic acid ester of the formula (I), and up to 1.0 wt. %, more preferably 0.0001 to 0.5 wt. %, particularly preferably 0.01 to 0.1 wt. %, of the inhibitor, based on the total weight of the reactive resin.

The reactive resin according to the invention is used for the preparation of reactive resin components for chemical fastening technology.

A further subject of the invention is therefore a reactive resin component which, in addition to the reactive resin, contains conventional inorganic or organic aggregates, such as fillers, thickeners, thixotropic agents, non-reactive solvents, agents for improving the flowability and/or wetting agents. The fillers are preferably selected from the group consisting of particles of quartz, fused silica, corundum, calcium carbonate, calcium sulfate, glass and/or organic polymers of various sizes and shapes, for example as sand or flour, in the form of balls or hollow balls, but also in the form of fibers made of organic polymers, such as polymethyl methacrylate, polyester, polyamide or in the form of microspheres made of polymers (bead polymers). The globular, inert substances (spherical form) have a preferred and more pronounced reinforcing effect.

Preferred thickeners or thixotropic agents are those based on silicates, bentonite, laponite, fumed silica, polyacrylates and/or polyurethanes.

The inorganic or organic aggregates can be contained in the reactive resin component in an amount of from 20.0 to 80.0 wt. %, more preferably 25.0 to 60.0 wt. %, even more preferably 35.0 to 55.0 wt. %, particularly preferably 40.0 to 50.0 wt. %, based on the total weight of the reactive resin component.

Another subject of the invention is a multi-component system which comprises at least two (spatially) separate components A and B. The multi-component system comprises two or more separate, interconnected and/or nested containers, one containing component A, the reactive resin component, and the other containing component B, the hardener component.

The multi-component system according to the invention preferably contains the reactive resin component (component A) and the hardener component (component B) in a weight ratio of approximately 3:1 to approximately 7:1, more preferably from approximately 4:1 to approximately 6:1. The multi-component system according to the invention particularly preferably contains the reactive resin component (component A) and the hardener component (component B) in a weight ratio of approximately 5:1.

The multi-component system can be present in the form of a shell, a cartridge or a foil pouch. In the intended use of the reactive resin mortar according to the invention, the component A and the component B are either ejected from the shells, cartridges or film pouches under the application of mechanical forces or by gas pressure, are mixed together, preferably by means of a static mixer through which the components are passed, and introduced into the borehole, whereafter the device to be fixed, such as an anchor threaded rod or the like, are introduced into the borehole loaded with the curing reactive resin and adjusted accordingly.

Preferred curing agents in hardener component B are storage-stable organic peroxides. Dibenzoyl peroxide and methyl ethyl ketone peroxide, furthermore tert-butyl perbenzoate, cyclohexanone peroxide, lauroyl peroxide and cumene hydroperoxide, and also tert-butyl peroxy-2-ethylhexanoate are particularly suitable.

The peroxides are used in amounts of from 0.2 to 10 wt. %, preferably 0.3 to 3 wt. %, based on the reactive resin component.

In a particularly preferred embodiment of the multi-component system according to the invention, the component A also contains, in addition to the reactive resin, a hydraulically setting or polycondensable inorganic compound, in particular cement, and the component B also contains, in addition to the curing agent, water. Such hybrid mortar systems are described in detail in DE 42 31 161 A1. In this case, component A preferably contains, as a hydraulically setting or polycondensable inorganic compound, cement, for example Portland cement or alumina cement, iron oxide-free or iron oxide-low cements being particularly preferred. Gypsum can also be used as a hydraulically setting inorganic compound as such or in a mixture with the cement.

Component A may also comprise silicatic, polycondensable compounds, in particular soluble, dissolved and/or amorphous silica-containing substances, as the polycondensable inorganic compound.

Another subject of the present invention is the use of at least one itaconic acid ester of the formula (I) as a reactive diluent in a reactive resin component for the chemical fastening of an anchoring means in a borehole.

The anchoring means is preferably made of steel or iron.

Additionally or alternatively, the borehole is preferably a borehole in a mineral or metal substrate, preferably a substrate selected from the group consisting of concrete, aerated concrete, brickwork, limestone, sandstone, natural stone, glass and steel.

The advantage of the invention is that the curing properties of the reactive resin or the reactive resin component containing said reactive resin can be influenced by the selection of the corresponding itaconic acid esters. In addition, it could be shown that it is possible to replace conventional petrochemical-based components of reactive resins and thus components of a reactive resin component containing these reactive resins with bio-based components without this having a negative effect on the properties of the reactive resin component.

The following examples serve to explain the invention in greater detail.

EXAMPLES

1. Preparation of the Oligomeric Itaconic Acid Esters

The reaction vessel (RC-1, Mettler Toledo), preheated to approximately 50° C., was stabilized with 1012.16 g (6.4 mol) dimethyl itaconate (DMI; TCI>98%, stabilized with hydroquinone monomethyl ether (HOME)), 504.56 g (5.6 mol) 1,4-butanediol (Aldrich, 99%) and 0.72 g HQME (SIGMA Aldrich, ReagentPlus 99%, 0.103 mol. % based on DMI) and the mixture is homogenized with stirring. Subsequently, 10.116 g (1 wt. % based on DMI) Ti(OBu)$_4$ (Aldrich, 97%) was added. After the apparatus was closed, gradual heating to 150° C. was carried out. The methanol released from the apparatus began to distill from a melt temperature of approximately 125° C. It was condensed and collected in the mounted Liebig cooler. After the start of the reaction, the temperature was permanently adjusted in order to ensure that the methanol released was distilled off uniformly. The progress of the reaction was monitored by $^1$H-NMR. The transesterification was completed a maximum of 5 hours after the distillation of the MeOH had started and the composition was cooled to approximately 50° C. After reaching this temperature, a vacuum (max. 20 mbar) was applied to remove the remaining methanol released. After a further 4 h, the residual MeOH content was reduced to <0.3 wt. %.

The molar mass ($M_w$) of the itaconic acid esters obtained was determined as follows: the MALDI tests were carried out using an Autoflex Speed TOF/TOF system (Bruker Daltonics GmbH) using a pulsed laser beam at an acceleration voltage of 20 kV in the reflector or linear mode. For the preparation, the oligomers, the matrix dithranol and the salt sodium trifluoroacetate were dissolved in chloroform, mixed and dropped onto a target. The measurement was carried out after the solvent had evaporated. FIG. 1 shows the results of the molar mass determination.

The product could be left out and used without further processing for use in reactive resins or reactive mortars. Table 1 lists the results of a total of 6 tests to illustrate the reproducibility of the transesterification. Comparable products were obtained.

TABLE 1

Results of the transesterification tests

| Sample | Conversion OCH3 [mol. %] | Content of double-esterified butanediol [mol. %] | Residual content of butanediol [mol. %] |
|---|---|---|---|
| A[1] | 77 | 75 | 2 |
| B[1] | 74 | 69 | 3 |
| C[1] | 75 | 73 | 2 |
| D[1] | 75 | 71 | 2 |
| E[1] | 77 | 77 | 2 |
| F[2] | 76 | 75 | 2 |

[1]Carried out in the 1.8 L reactor
[2]Carried out in the 500 mL reactor

2. Investigation of the Curing Behavior

The oligomeric itaconic acid ester obtained in Example 1 was added to reactive resins and their curing behavior was then examined. A mixture of urethane methacrylate resin (master batch A1), hydroxypropyl methacrylate (HPMA), the commercial reactive diluent 1,4-butanediol dimethacrylate (1,4-BDDMA) an aromatic amine (as an accelerator for peroxide decomposition) and TEMPOL and tert-butyl pyrocatechol (tBBK) was used as the standard resin. In this reactive resin, different amounts of the reactive diluent 1,4-BDDMA were replaced by the itaconic acid esters (Sample F) prepared in Example 1 (see Table 2). For curing, the reactive resin was mixed with benzoyl peroxide (Perkadox 20S, Akzo Nobel) in a suitable ratio.

TABLE 2

Composition of the investigated reactive resins

| Sample | Proportion of itaconic acid ester [mol. %] | A1 [g] | 1,4-BDDMA [g] | Itaconic acid ester [g] | DiPT [g] | TEMPOL [g] | tBBK [g] |
|---|---|---|---|---|---|---|---|
| Reference | 0% | 42.68 | 25.60 | 0 | 1.47 | 0.02 | 0.22 |
| Sample 1 | 20% | 42.68 | 20.48 | 7.76 | 1.47 | 0.02 | 0.22 |
| Sample 2 | 40% | 39.70 | 14.29 | 14.42 | 1.37 | 0.02 | 0.21 |
| Sample 3 | 60% | 38.37 | 9.20 | 20.9 | 1.32 | 0.02 | 0.20 |
| Sample 4 | 80% | 37.11 | 4.45 | 26.94 | 1.28 | 0.02 | 0.20 |

The temperature-time curve of the curing was then recorded as follows: Approximately 20 g of the reactive resin to be examined and the corresponding amount of hardener (Perkadox 20S, weight ratio 70:30) were weighed out in a plastic beaker. As the system is sensitive to the ambient temperature, the components must be kept at 25° C. The temperature was controlled in a thermostat (B12/C11 Prüfgerätewerk Medingen GmbH). The measurement was started immediately before the reaction components were mixed. The hardener was added to the resin component and stirred well with a wooden spatula for 40 s. The mixture was poured into two test tubes approximately 6 cm high, each of which was suspended separately in a measuring cylinder located in the thermostat. A temperature sensor (K-type, 150 mm long Ø 1.5 mm) coated with silicone paste was then immersed in the middle of each mixture at a depth of 2 cm. Since the ambient temperature was registered until the sensors were immersed, the shape of the curve at the start of the measurement is not relevant, which is why the temperature-time curves were only used for the evaluation from 100 seconds. The temperature curve was registered by means of the sensors connected to a Voltkraft Datalogger K202 (connected to a PC). The maximum temperature of the curve ($T_{max}$) and the time at 35° C. were read off as results in the shape of the curve (schematically shown in FIG. 2). Three duplicate determinations were made per system. The measured temperature-time curves are shown in FIG. 3.

The maximum temperature of the composition T and the time taken to reach this temperature $T_{max}$ were evaluated as the results of these measurements. A $T_{max}$ (a measure of the heat of polymerization released during curing) that is comparable to the reference indicates the desired incorporation of the added reaction products into the network being formed. The percentages given in the following for the addition of the oligomeric itaconic acid ester in mol. % are based on the proportion of 1,4-BDDMA in the mixture. The number of double bonds in the itaconic acid ester is taken into account in these calculations, so that there is always an approximately constant amount of reactive double bonds in the mixture. The results are summarized in Table 3.

As the proportion of itaconic acid esters in the reactive resin increases, the $T_{max}$ drops to approximately 130° C., while the times until the $T_{max}$ is adjusted decrease. The results show that the 1,4-BDDMA can be replaced by the itaconic acid ester without this having a negative effect on the curing reaction.

TABLE 3

Results of the curing tests

| Sample | mol. % 1,4-BDDMA replaced by itaconic acid ester | $T_{max}$ [° C.] | σ [° C.] | Tmax [min] | σ [min] |
|---|---|---|---|---|---|
| Reference | 0 | 156 | 1 | 05:06 | 00:05 |
| Sample 1 | 20 | 153 | 1 | 04:05 | 00:08 |
| Sample 2 | 40 | 146 | 1 | 03:39 | 00:04 |
| Sample 3 | 60 | 137 | 2 | 03:21 | 00:04 |
| Sample 4 | 80 | 128 | 1 | 03:14 | 00:05 |

3. Preparation of Reactive Resin Systems

A1: Reactive Resin Masterbatch A1 was Prepared in the Following Way:

The reactive resin master batch was synthesized with 65 wt. % of the comparative compound 1 as the base resin and 35 wt. % hydroxypropyl methacrylate (Visiomer® HPMA; Evonik Degussa GmbH), in each case based on the total weight of the reactive resin master batch, according to the method in EP 0 713 015 A1, which is hereby introduced as a reference and reference is made to the entire disclosure thereof. The product has the following structure, there being an oligomer distribution where n=0 to 3:

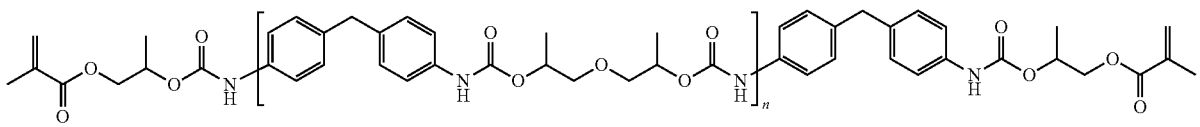

B1: Reactive Resin Masterbatch B1 was Prepared in the Following Way:

80400 g of hydroxypropyl methacrylate (Visiomer® HPMA; Evonik Degussa GmbH) were provided in a 300 liter steel reactor having an internal thermometer and stirrer shaft and were mixed with 36 g phenothiazine (D Prills; Allessa Chemie), 70 g 4-hydroxy-2,2,6,6-tetramethyl-piperdinyl-1-oxyl (TEMPOL; Evonik Degussa GmbH) and 56 g dioctyltin dilaurate (TIB KAT® 216; TIB Chemicals). The batch was heated to 60° C. Subsequently, 69440 g of methylene di(phenyl isocyanate) (MDI; Lupranat® MIS; BASF SE) were added dropwise with stirring for 1.5 h. The mixture was then stirred at 80° C. for a further 45 minutes. 50,000 g 1,4-butanediol dimethacrylate (Visiomer 1,4-BDDMA, Evonik Degussa GmbH) were then added. The reactive resin master batch B1 was obtained, which contains 75 wt. % of the compound shown below as a base resin and 25 wt. % 1,4-butanediol dimethacrylate (Visiomer 1,4-BDDMA, Evonik Degussa GmbH), based on the total weight of the reactive resin master batches. The compound has the following structure:

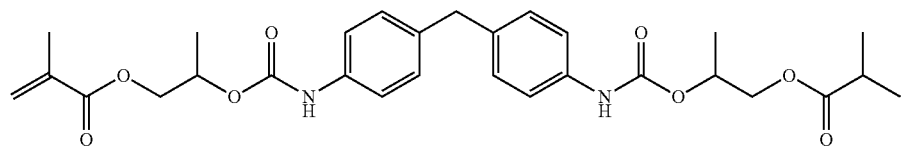 [SMILES: C=C(C)C(=O)OCC(C)OC(=O)Nc1ccc(Cc2ccc(NC(=O)OC(C)COC(=O)C(C)C)cc2)cc1]

A2: Reactive Resin Masterbatch A2 was Prepared from Reactive Resin Master Batch A1 in the Following Way:

1147.8 g (57.34 wt. %) of master batch A1 was mixed with 400 g (20 wt. %) 1,4-butanediol dimethacrylate (Visiomer 1,4-BDDMA, Evonik Degussa GmbH), 46 g (2.3 wt. %) di-isopropanol-p-toluidine (BASF SE), 4.6 g (0.23 wt. %) catechol (Catechol Flakes, RHODIA) and 1 g (0.05 wt. %) tert-butyl pyrocatechol (tBBK, CFS EUROPE S.p.A. (Borregaard Italia S.p.A.)) and stirred until completely homogenized.

B2: Reactive Resin Masterbatch B2 was Prepared from Reactive Resin Master Batch B1 in the Following Way:

1013.4 g (50.67 wt. %) of master batch B1 was mixed with 400 g (20 wt. %) 1,4-butanediol dimethacrylate (Visiomer 1,4-BDDMA, Evonik Degussa GmbH), 162.6 g (8.13 wt. %) hydroxypropyl methacrylate (Inchem), 22.4 g (1.12 wt. %) di-isopropanol-p-toluidine (BASF SE) and 0.3 g (0.015 wt. %) 4-hydroxy-2,2,6,6-tetramethyl-piperidinyl-1-oxyl (TEMPOL; Evonik Degussa GmbH) and stirred until completely homogenized.

The reactive resins A3.1, A3.2 and A3.3 and B3.1, B3.2 and B3.3 were then produced by the dissolving or mixing and subsequent homogenization of the reactive resin master batches A2 and B2, respectively. The compositions of the reactive resins are summarized in Tables 4a and 4b.

TABLE 4a

Compositions of the reactive resins (A series)

|  |  | Reactive resin (total quantity) | | |
|---|---|---|---|---|
|  |  | A3.1 (500 g) | A3.2 (400 g) | A3.3 (336 g) |
| Master batch A2 | [g] | 399.6 | 319.7 | 268.2 |
|  | [wt. %] | 79.92 | 79.92 | 79.92 |
| Catechol | [g] | 0.2 | 0.2 | 0.1 |
|  | [wt. %] | 0.04 | 0.05 | 0.03 |
| tBBK | [g] | 0.2 | 0.2 | 0.1 |
|  | [wt. %] | 0.04 | 0.05 | 0.03 |
| 1, 4-BDDMA | [g] | 100 |  |  |
|  | [wt. %] | 20 |  |  |
| Methyl butandiol itaconate | [g] |  | 80 |  |
|  | [wt. %] |  | 20 |  |
| Diethyl malonate | [g] |  |  | 67.1 |
|  | [wt. %] |  |  | 20 |

TABLE 4a

Compositions of the reactive resins (B series)

|  |  | Reactive resin (total quantity) | | |
|---|---|---|---|---|
|  |  | B3.1 (336 g) | B3.2 (340 g) | B3.3 (340 g) |
| Master batch B2 | [g] | 271.8 | 271.4 | 272.0 |
|  | [wt. %] | 79.94 | 79.94 | 79.94 |
| tBBK | [g] | 0.34 | 0.41 | 0.22 |
|  | [wt. %] | 0.1 | 0.12 | 0.065 |

TABLE 4a-continued

Compositions of the reactive resins (B series)

|  |  | Reactive resin (total quantity) | | |
|---|---|---|---|---|
|  |  | B3.1 (336 g) | B3.2 (340 g) | B3.3 (340 g) |
| 1,4-BDDMA | [g] | 68 |  |  |
|  | [wt. %] | 20 |  |  |
| Methyl butandiol itaconate | [g] |  | 68 |  |
|  | [wt. %] |  | 20 |  |
| Diethyl malonate | [g] |  |  | 68 |
|  | [wt. %] |  |  | 20 |

The reactive resin components A4.1, A4.2 and A4.3 and B4.1, B4.2 and B4.3 were prepared from the reactive resins A3.1, A3.2 and A3.3 and B3.1, B3.2 and B3.3, respectively, as follows:

The reactive resin was mixed with Secar®80 (Kemeos Inc.), Cab-O-Sil® TS-720 (Cabot Corporation), Aerosil R-812 (Evonik) and quartz sand F32 (Quarzwerke GmbH) in a dissolver under vacuum (the respective amounts can be found in Tables 3a and 3b below). Mixing took place with a PC laboratory system dissolver of the type LDV 0.3-1 for 8 minutes (2 min: 2500 rpm; then 6 min: 3500 rpm; each at a pressure <100 mbar) with a 55 mm dissolver disc and an edge scraper. The compositions of the reactive resin components are summarized in Tables 5a and 5b.

TABLE 5a

Compositions of the reactive resin components (A series)

|  |  | Reactive resin component (total quantity) | | |
|---|---|---|---|---|
|  |  | A4.1 (900 g) | A4.2 (900 g) | A4.3 (720 g) |
| Reactive resin | [g] | 310.5 (A3.1) | 310.5 (A3.2) | 248.0 g (A3.3) |
|  | [wt. %] | 34.5 | 34.5 | 34.5 |
| Secar ® 80 | [g] | 166.5 | 166.5 | 133.4 |
|  | [wt. %] | 18.5 | 18.5 | 18.5 |
| Cab-O-Sil ® TS-720 | [g] | 9.0 | 9.0 | 7.2 |
|  | [wt. %] | 1.0 | 1.0 | 1.0 |
| Aerosil ® R-812 | [g] | 16.2 | 16.2 | 13.0 |
|  | [wt. %] | 1.8 | 1.8 | 1.8 |
| Quartz sand F32 | [g] | 398 | 398 | 318.2 |
|  | [wt. %] | 44.2 | 44.2 | 44.2 |

TABLE 5b

Compositions of the reactive resin components (B series)

| | | Reactive resin component (total quantity) | | |
|---|---|---|---|---|
| | | B4.1 (840 g) | B4.2 (840 g) | B4.3 (835 g) |
| Reactive resin | [g] | 289.9 (B3.1) | 289.9 (B3.2) | 289 (B3.3) |
| | [wt. %] | 34.5 | 34.5 | 34.5 |
| Secar ® 80 | [g] | 155.3 | 155.3 | 154.6 |
| | [wt. %] | 18.5 | 18.5 | 18.5 |
| Cab-O-Sil ® TS-720 | [g] | 8.9 | 8.4 | 8.3 |
| | [wt. %] | 1.0 | 1.0 | 1.0 |
| Aerosil ® R-812 | [g] | 15.2 | 15.1 | 15.0 |
| | [wt. %] | 1.8 | 1.8 | 1.8 |
| Quartz sand F32 | [g] | 371.2 | 371.0 | 370.0 |
| | [wt. %] | 44.2 | 44.2 | 44.2 |

The two-component reactive resin systems A5.1, A5.2 and A5.3 were then prepared from the reactive resin components A4.1, A4.2 and A4.3 as follows:

For the preparation of the two-component reactive resin systems, the reactive resin components (component (A)) were combined with a hardener component (component (B)) of the commercially available product HIT HY-200 (Hilti Aktiengesellschaft: batch number: 8103926) and filled into plastic cartridges (Ritter GmbH; volume ratio A:B=5:1) having inner diameters of 32.5 mm (component (A)) and 14 mm (component (B)).

The two-component reactive resin systems B5.1, B5.2 and B5.3 were then prepared from the reactive resin components B4.1, B4.2 and B4.3 as follows:

For the preparation of the two-component reactive resin systems, the reactive resin components (component (A)) were combined with a hardener component (component (B)) of the commercially available product HIT-CT 1 (Hilti Aktiengesellschaft; batch number 8600465) and filled into plastic cartridges (Ritter GmbH; volume ratio A:B=3:1) having inner diameters of 47 mm (component (A)) and 28 mm (component (B)).

Evaluation:

The reactive resins A3.1 to A3.3 and the reactive resins B3.1 to B3.3 were examined for their reactivity. Since the curing system of the reactive resins of the A series produces significantly more initiator radicals than the reactive resins of the B series, a comparison of the two systems is intended to show whether there is a difference depending on the initiator radical amount when using reactive diluents containing itaconate. The question to be answered is therefore whether approximately the same amount of itaconate copolymerizes in the two very different systems. The amount of heat released during the reaction was determined as an indirect approximate but sufficient measure for this purpose. For this purpose, the resins were mixed intensively with gypsum-stabilized dibenzoyl peroxide (Perkadox 20S, AkzoNobel). In the case of the A series reactive resins, 70 g reactive resin was mixed intensively with 30 g Perkadox 20S. In the case of the B series reactive resins, 70 g reactive resin was mixed intensively with 6 g Perkadox 20S. The reactivity period was measured; this is understood to mean the resin reactivity ($t_{r,25} \rightarrow T_{max}$) of a resin or a resinous composition expressed as the time from the time of addition of an initiator to initialize the cure to the time when the composition has reached the maximum temperature ($T_{max}$). The maximum temperature ($T_{max}$) was also measured. The measurement was carried out using a conventional device (Geltimer, WKS Informatik). Both the reactive resin and the Perkadox were previously heated to 25° C. in a drying cabinet. The mixture was filled into a test tube after the addition of the initiator, up to a height of 4 cm below the rim, the test tube being kept at a temperature of 25° C. (DIN 16945, DIN EN ISO 9396). A temperature sensor which recorded a temperature-time curve was immediately introduced into the mixture. Table 6 shows the results of these measurements:

TABLE 6

Results of the temperature measurements

| Reactive resin | $t_{r,25} \rightarrow T_{max}$ [mm:SS] | $T_{max}$ [° C.] |
|---|---|---|
| A3.1 | 08:25 | 160 |
| A3.2 | 07:16 | 147 |
| A3.3 | 09:24 | 141 |
| B3.1 | 09:37 | 166 |
| B3.2 | 08:33 | 145 |
| B3.3 | 07:02 | 142 |

The reactivity time of the resins is comparable in the usual range of these measurements. The shape of the curves, from which a possible retardation could be identified, was also the same, which indicates normal curing.

Both positive references A3.1 and B3.1 with 20 wt. % 1,4-butanediol dimethacrylate show that complete polymerization can produce a temperature increase up to approximately 160 and 166° C., respectively. Both negative references A3.3 and B3.3 with 20 wt. % diethyl malonate show that when 20 wt. % unreactive material is used, the temperature can only increase to approximately 141 and 142° C., respectively. The resins of inventive examples A3.2 and B3.2 exhibit a temperature increase to 147 and 145° C., respectively.

In order to investigate the effects of the methyl butanediol diitaconate oligomer in comparison to the references, the bond stresses of the two-component reactive resin systems were determined. In order to determine the bond stresses (load values) of the cured fixing compositions, M12 anchor threaded rods were inserted into boreholes in C20/25 concrete having a diameter of 14 mm and a borehole depth of 72 mm, which boreholes were filled with the reactive resin mortar compositions. The bond stresses were determined by centric extension of the anchor threaded rods. In each case, five anchor threaded rods were placed and after 24 hours of curing, the bond stress was determined. The fixing compositions were ejected out of the cartridges via a static mixer (HIT-RE-M mixer; Hilti Aktiengesellschaft) and injected into the boreholes. The following borehole conditions were set to determine the bond stress: the borehole was hammer-drilled in dry concrete and made dust-free by cleaning. Placing, curing and extending the anchor rod take place at room temperature. Table 7 shows the results of these measurements. The composite stresses shown are average values from five measurements.

TABLE 7

Bond stresses

| Reactive resin system | Bond stress [N/mm²] |
|---|---|
| A5.1 | 30.7 |
| A5.2 | 26.8 |
| A5.3 | 15.5 |
| B5.1 | 15.9 |
| B5.2 | 13.3 |
| B5.3 | 12.3 |

The results show that the reactive resin systems A5.2 and B5.2, which each contain the itaconic acid ester according to the invention, have a bond stress comparable to the positive references A5.1 and B5.1, which contain a fossil reactive diluent. By using the biogenic reactive diluent according to the invention, the curing properties and the bond stress of the resulting reactive resin system are not adversely affected.

Figure 1:
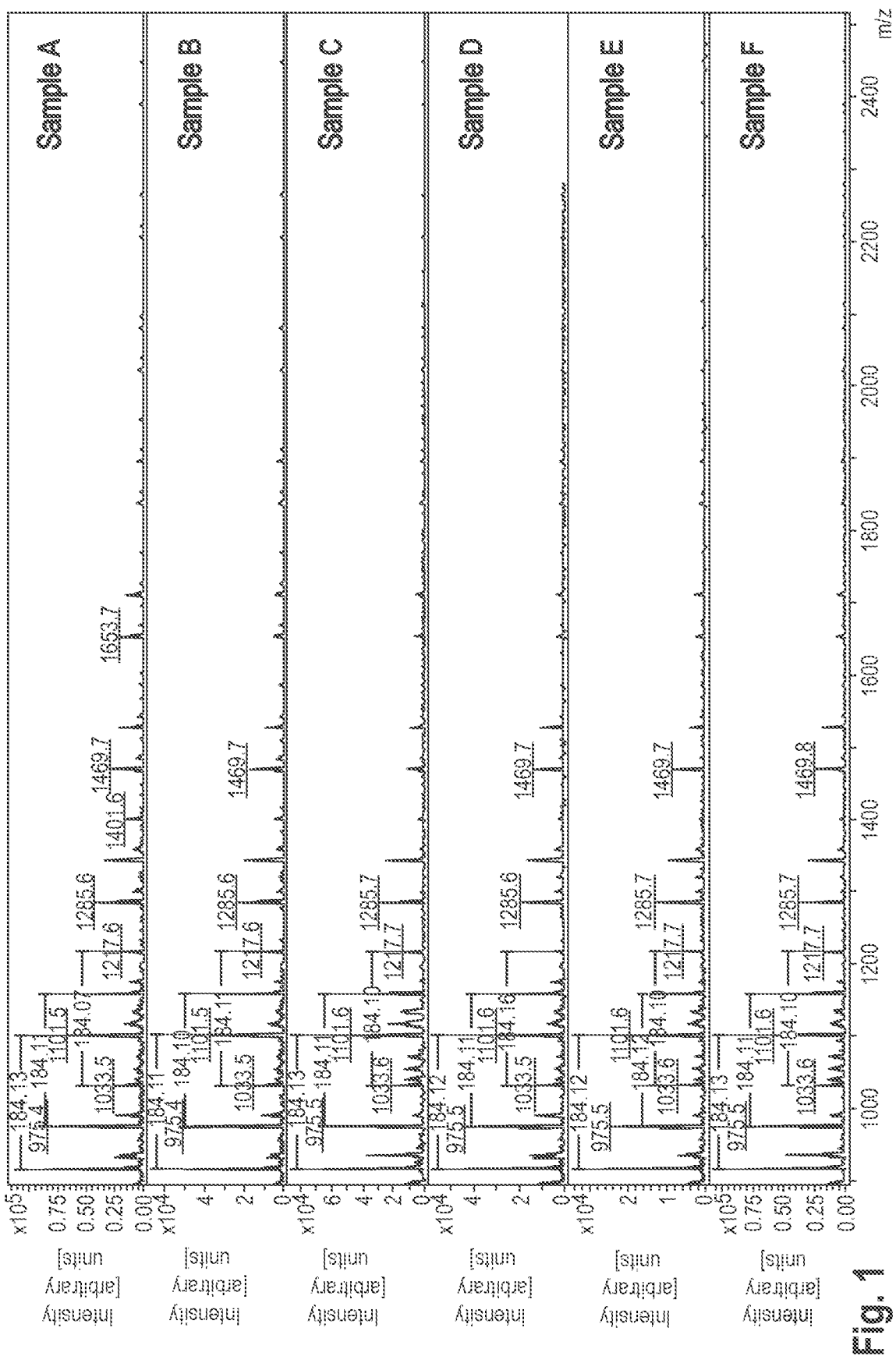
FIG. 1 shows the results of MALDI investigations for determining the molar mass of the oligomeric itaconic acid ester; Sample F is the oligomer used in the practical examples.
Figure 2:
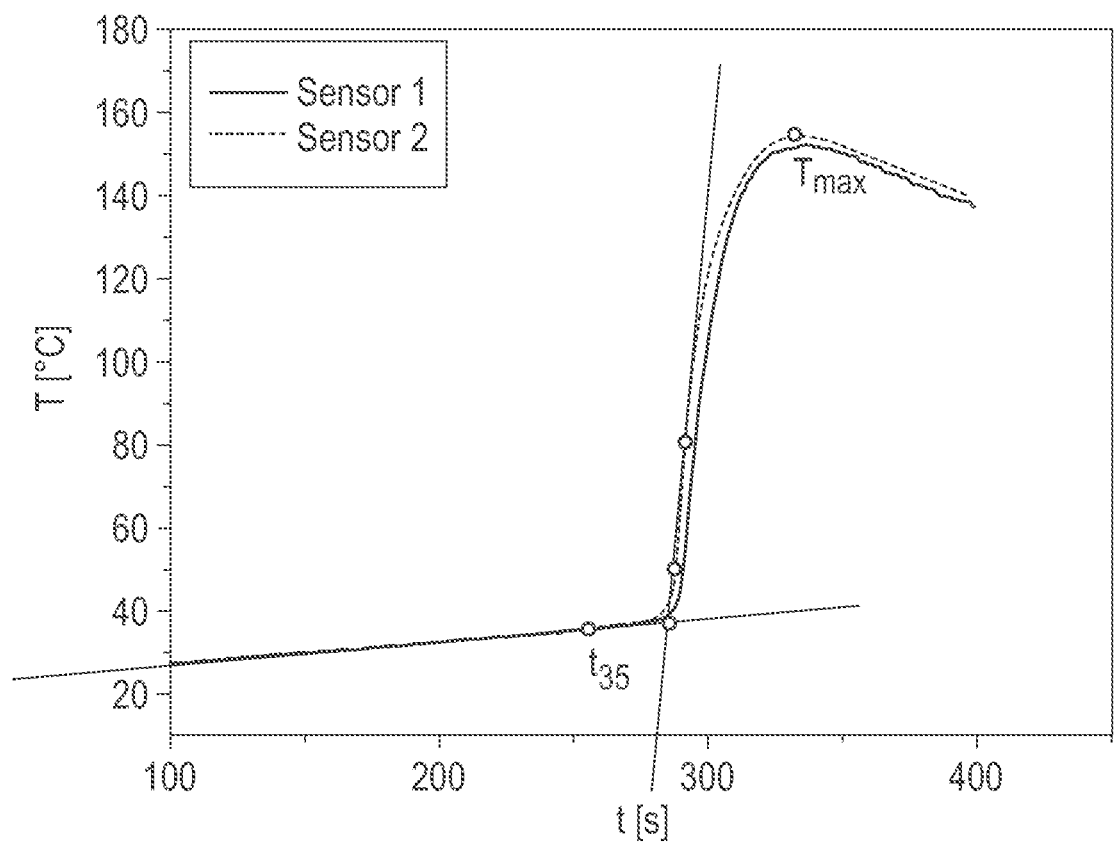
FIG. 2 is a schematic representation of the evaluation of temperature-time curves.
Figure 3:
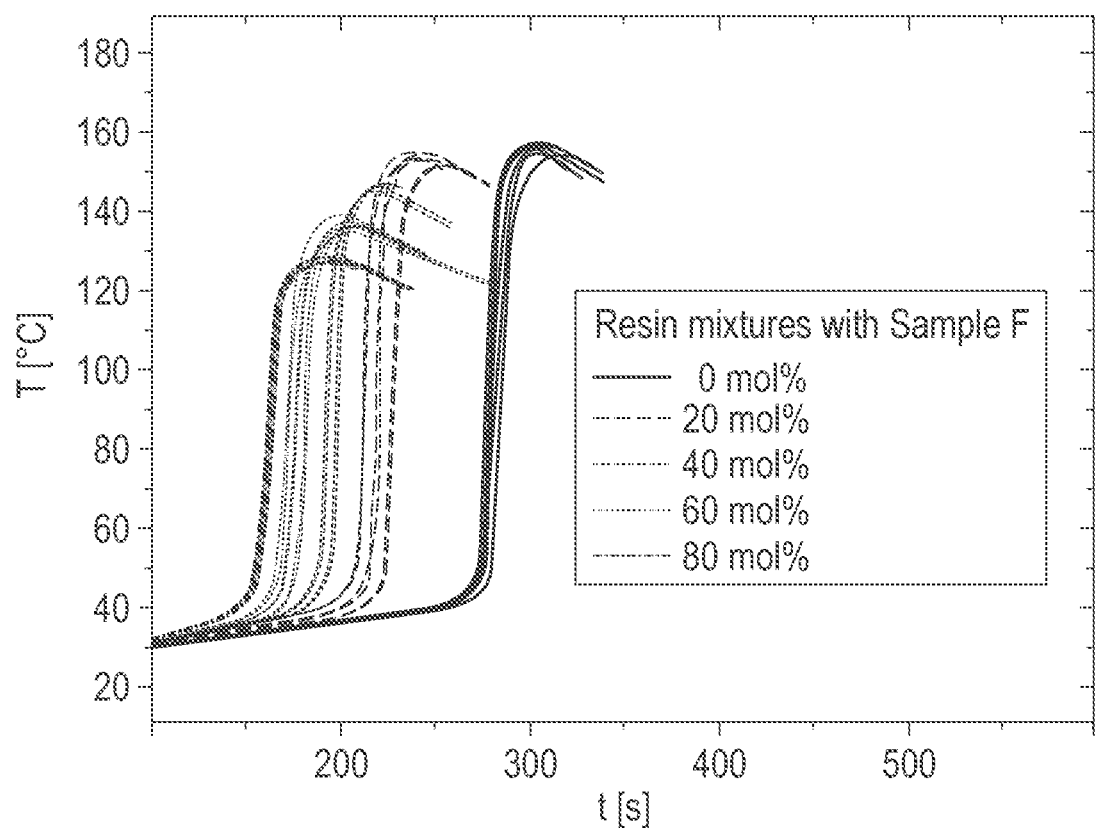
FIG. 3 shows the temperature-time curves measured in Example 2.

The invention claimed is:

1. A reactive resin, comprising:
   i) a base resin comprising at least one vinyl ester resin, and
   ii) at least one itaconic acid ester of formula (I),

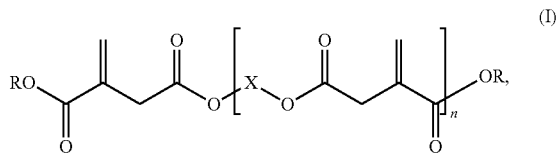

in which
   R represents hydrogen or a $C_1$-$C_6$ alkyl group,
   X represents a $C_2$-$C_{10}$ alkylene group, and
   n is ≥2.

2. The reactive resin according to claim 1, wherein the at least one itaconic acid ester of the formula (I) has a weight-average molar mass $M_w$, of at least 500 g/mol.

3. The reactive resin according to claim 1, wherein the at least one itaconic acid ester of the formula (I) is completely obtainable from a renewable raw material.

4. The reactive resin according to claim 1, wherein the at least one vinyl ester resin is a vinyl urethane ester resin.

5. The reactive resin according to claim 1, further comprising at least one inhibitor.

6. The reactive resin according to claim 5, wherein the at least one inhibitor is selected from the group consisting of 2-methoxyphenol, 4-methoxyphenol, 2,6-di-tert-butyl-4-methylphenol, 2,4-di-tert-butylphenol, 2,6-di-tert-butylphenol, 2,4,6-trimethylphenol, 2,4,6-tris(dimethylaminomethyl)phenol, 4,4'-thio-bis(3-methyl-6-tert-butylphenol 4,4'-isopropylidenediphenol, 6,6'-di-tert-butyl-4,4'-bis (2,6-di-tert-butylphenol), 1,3,5-trimethyl-2,4,6-tris(3,5-di-tert-butyl-4-hydroxybenzyl)benzene, 2,2'-methylene-di-p-cresol, pyrocatechol, 4-tert-butyl pyrocatechol, 4,6-di-tert-butyl pyrocatechol, hydroquinone, 2-methylhydroquinone, 2-tert-butylhydroquinone, 2,5-di-tert-butylhydroquinone, 2,6-di-tert-butylhydroquinone, 2,6-dimethylhydroquinone, 2,3,5-trimethylhydroquinone, benzoquinone, 2,3,5,6-tetrachloro-1,4-benzoquinone, methylbenzoquinone, 2,6-dimethylbenzoquinone, naphthoquinone, and mixtures thereof.

7. The reactive resin according to claim 5, comprising:
   i) 50.0 to 95.0 wt. % of the base resin, comprising the at least one vinyl ester resin,
   ii) 5.0 to 40.0 wt. % of the at least one itaconic acid ester of the formula (I), and
   iii) up to 1.0 wt. % of the at least one inhibitor, based on a total weight of the reactive resin.

8. A reactive resin component, comprising:
   the reactive resin according to claim 1, and
   at least one inorganic or organic aggregate.

9. The reactive resin component according to claim 8, wherein the at least one inorganic or organic aggregate is selected from the group consisting of fillers, thickeners, thixotropic agents, non-reactive solvents, agents for improving flowability, wetting agents, and mixtures thereof.

10. The reactive resin component according to claim 8, comprising:
    30 to 80 wt. % of the at least one inorganic or organic aggregate, based on a total weight of the reactive resin component.

11. A multi-component system, comprising:
    the reactive resin component according to claim 8, and
    B) a hardener component.

12. The multi-component system according to claim 11, wherein the hardener component comprises:
    a radical initiator as a curing agent, and
    optionally inorganic and/or organic aggregates.

13. The multi-component system according to claim 11, wherein a weight ratio of the reactive resin component to the hardener component is in a range of approximately 3:1 to approximately 7:1.

14. A method for chemical fastening, comprising:
    fastening with the reactive resin of claim 1.

15. The method according to claim 14, wherein the chemical fastening is fastening of an anchor in a borehole.

16. The method according to claim 15, wherein the anchor comprises steel or iron.

17. The method according to claim 14, wherein the reactive resin further comprises:
    a base resin comprising at least one vinyl ester resin, and
    at least one inhibitor.

18. The method according to claim 17, wherein the at east one vinyl ester resin is a vinyl urethane ester resin.

19. The method according to claim 17, wherein the at least one inhibitor is selected from the group consisting of 2-methoxyphenol, 4-methoxyphenol, 2,6-di-tert-butyl-4-methylphenol, 2,4-di-tert-butylphenol, 2,6-di-tert-butylphenol, 2,4,6-trimethylphenol, 2,4,6-tris(dimethylaminomethyl)phenol, 4,4'-thio-bis(3-methyl-6-tert-butylphenol), 4,4'-isopropylidenediphenol, 6,6'-di-tert-butyl-4,4'-bis (2,6-di-tert-butylphenol), 1,3,5-trimethyl-2,4,6-tris(3,5-di-tert-butyl-4-hydroxybenzyl)benzene, 2,2'-methylene-di-p-cresol, pyrocatechol, 4-tert-butyl pyrocatechol, 4,6-di-teabutyl pyrocatechol, hydroquinone, 2-methylhydroquinone, 2-tert-butylhydroquinone, 2,5-di-tert-butylhydroquinone, 2,6-di-tert-butylhydroquinone, 2,6-dimethylhydroquinone, 2,3,5-trimethylhydroquinone, benzoquinone, 2,3,5,6-tetrachloro-1,4-benzoquinone, methylbenzoquinone, 2,6-dimethylbenzoquinone, naphthoquinone, and mixtures thereof.

20. The method according to claim 17, wherein the reactive resin comprises:
    50.0 to 95.0 wt. % of the base resin, comprising the at least one vinyl ester resin,
    ii) 5.0 to 40.0 wt. % of the at least one itaconic acid ester of formula (I), and
    iii) up to 1.0 wt. % of the at least one inhibitor, based on the total weight of the reactive resin.

* * * * *